(12) United States Patent
Merkel et al.

(10) Patent No.: US 7,018,667 B2
(45) Date of Patent: Mar. 28, 2006

(54) MELTABLE FORM OF SUCRALOSE

(75) Inventors: Carolyn M. Merkel, North Haledon, NJ (US); Ning Wang, Plainsboro, NJ (US); Jean Lee, Bridgewater, NJ (US)

(73) Assignee: Tate & Lyle Public Limited Company, London (GB)

( * ) Notice: Subject to any disclaimer, the term of this patent is extended or adjusted under 35 U.S.C. 154(b) by 0 days.

(21) Appl. No.: 10/011,120

(22) Filed: Nov. 13, 2001

(65) Prior Publication Data

US 2003/0091714 A1    May 15, 2003

Related U.S. Application Data

(60) Provisional application No. 60/249,616, filed on Nov. 17, 2000.

(51) Int. Cl.
    *A23L 1/236* (2006.01)
(52) U.S. Cl. .................. 426/548; 426/471; 426/660
(58) Field of Classification Search ............. 426/548, 426/89, 103, 237, 438, 471, 660
    See application file for complete search history.

(56) References Cited

U.S. PATENT DOCUMENTS

| 4,495,170 A | 1/1985 | Beyts et al. .......... 424/48 |
| 4,751,294 A | 6/1988 | Jackson |
| 4,801,700 A | 1/1989 | Tully et al. .......... 536/125 |
| 4,927,646 A | 5/1990 | Jenner et al. |
| 4,950,746 A | 8/1990 | Navia .................. 536/119 |
| 5,397,588 A | 3/1995 | Antenucci et al. |
| 5,470,969 A | 11/1995 | Sankey et al. ....... 536/115 |
| 5,498,709 A | 3/1996 | Navia et al. ......... 536/124 |

FOREIGN PATENT DOCUMENTS

| EP | 0 064 361 A2 | 11/1982 |
| EP | 0 255 260 A1 | 2/1988 |
| EP | 0 375 122 A2 | 6/1990 |

OTHER PUBLICATIONS

AN 1992(10) PO159 FSTA, abstracting WO 9202143.*
AN 602517 FROSTI, abstracting International Food Ingredients. 2002-2003, (Dec.-Jan.), (6), 28+30.*
AN 1995(09) T0019 FSTA, abstracting British Food Journal, (1995). 97(2), 10-17.*
PCT Search Report for PCT/US 01/47093 dated Sep. 11, 2002.
Sardesai V M et al, "Natural and synthetic intense sweeteners", Journal of Nutritional Biochemistry, Butterworth Publishers, Stoneham, GB, vol. 2, No. 5, May 5, 1991, pp. 236-244 XP-000892854.

* cited by examiner

*Primary Examiner*—Leslie Wong
(74) *Attorney, Agent, or Firm*—RatnerPrestia

(57) ABSTRACT

The present invention provides a meltable sucralose and acesulfame-k sweetener. This sweetener may be incorporated in a wide variety of reduced calorie food products such as cooked and hard candies, microwaveable food products, glazed food products, deep fried food products and as a substitute for sugar in applications that require melt sugar.

21 Claims, 2 Drawing Sheets

MELTABLE FORM OF SUCRALOSE

This application claims benefit of provisional patent application 60/249,616 filed Nov. 17, 2000.

FIELD OF THE INVENTION

The invention relates to a meltable form of sucralose and its uses in food products.

BACKGROUND OF THE INVENTION

Sucralose (4,1',6'-trichloro-4,1',6'-trideoxygalacto-sucrose) is a high intensity sweetener made from sucrose which can be used in many food and beverage applications. Sucralose, unlike many artificial sweeteners, can be used in baking. However, sucralose, in a dry state, decomposes at high temperatures (approximately 125° C. or 275° F.) simultaneously or prior to melting. The decomposition temperature of sucralose can be increased somewhat by diluting sucralose with a carrier. For example, sucralose can be combined (by spray drying, freeze drying, and other methods) with 50 weight percent maltodextrin to raise the decomposition temperature to about 145° C. (293° F.). Sucralose has also been dry blended with other sweeteners such as acesulfame-K (6-methyl-1,2,3,-oxathiazin-4(3H)-one-2,2-dioxide, potassium salt) as described in U.S. Pat. No. 4,495,170, however, sucralose in these dry blends still decomposes at elevated temperatures. Unfortunately, a sucralose composition that reversibly melts at high temperature without decomposing has never been reported. Having a meltable sucralose composition would be advantageous in the manufacture of food products such as hard candies and microwave products.

It is an object of the present invention to provide a sucralose composition that reversibly melts at high temperatures.

SUMMARY OF THE INVENTION

We have discovered a meltable sucralose-containing sweetener comprising an intimate mixture of sucralose and acesulfame-K.

In another embodiment of the present invention we have also discovered a food product containing a meltable sucralose sweetener.

In yet another embodiment of the present invention we have discovered a process for making a food product comprising adding a meltable sucralose-containing sweetener to the ingredients for a food product.

In yet a further embodiment of the present invention we have discovered a process for making a food product comprising in the preparation of a food product adding a melted sucralose-containing sweetener to said food product during the preparation of such food product.

These inventions and other inventions will be apparent to those skilled in the art from reading the following specification (including the Examples and Claims).

DETAILED DESCRIPTION OF THE INVENTION

Figure 1:
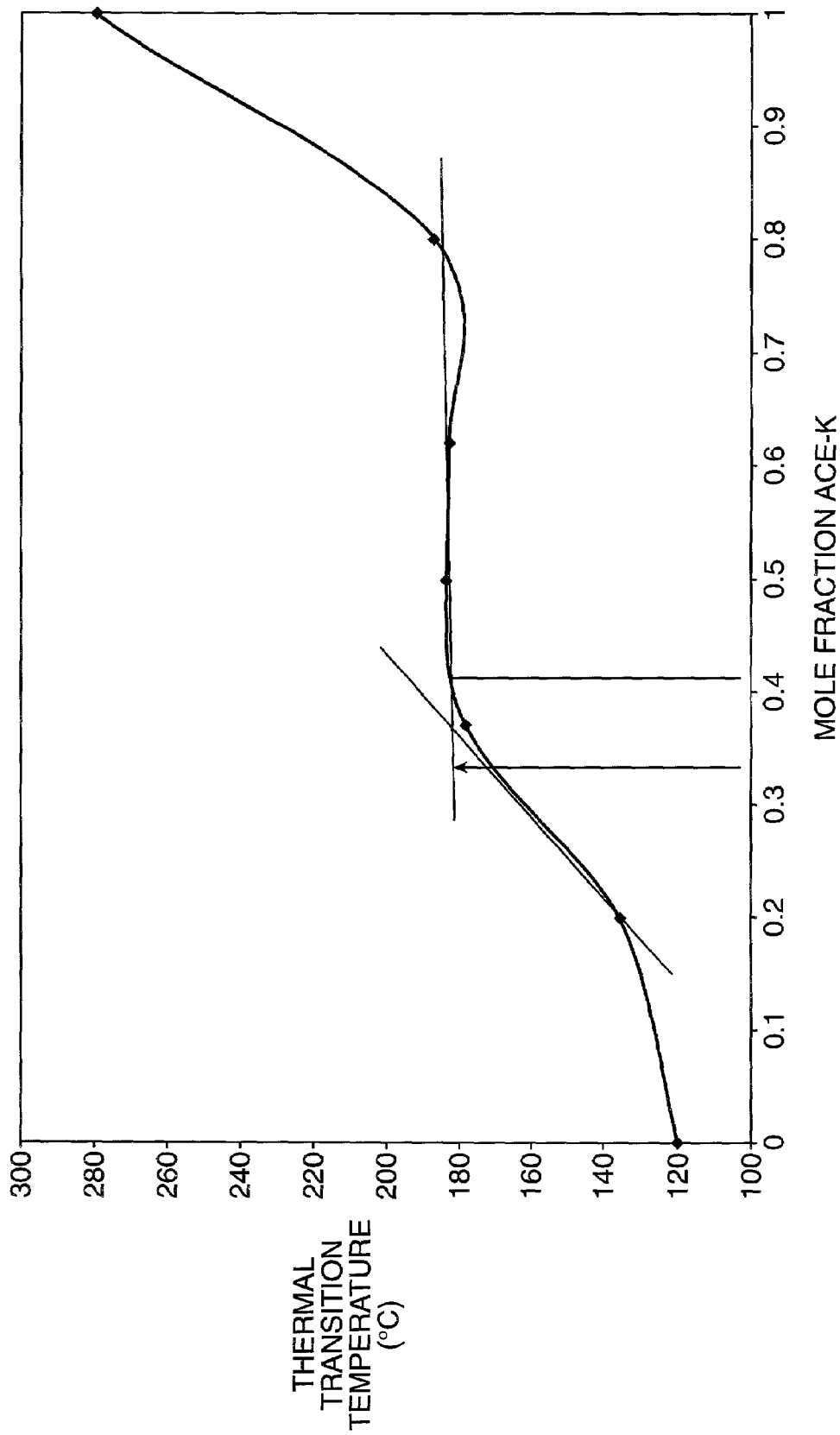
FIG. 1 is a plot of the thermal transition temperature of a sucralose and acesulfame-K blend.

Sucralose and the methods of making sucralose have been described in numerous patents such as U.S. Pat. Nos. 4,801,700; 4,950,746; 5,470,969; and 5,498,709 which are hereby incorporated herein by reference. Acesulfame-K is a commercial product of Nutrinova Nutrition Specialties & Food Ingredients GmbH.

It appears necessary in the process of making a meltable blend of sucralose and acesulfame-K to form an intimate blend of the ingredients rather than just a dry blend. Dry blending of the ingredients does not provide a meltable sucralose composition. The meltable blend of sucralose and acesulfame-K can be prepared by spray drying or by freeze drying an aqueous solution containing the two components in the desired proportions. Aqueous solutions containing sucralose and acesulfame-K can be prepared by dissolving the components in water, either separately or after dry mixing. The relative proportions of the components range from about 80 to about 20 mole percent sucralose and about 20 to about 80 mole percent acesulfame-K. Preferably the relative proportion of the components will range from about 70 to about 20 mole percent sucralose and about 30 to about 80 mole percent acesulfame-K. Most preferably the relative proportion of the components will range from about 65 to about 22 mole percent sucralose and about 35 to about 78 mole percent acesulfame-K. The total solids concentration in the solution can be up to about 80%, and preferably from 40 to about 60 percent (by weight), prior to spray- or freeze-drying. Drying can be performed using any standard processing technique.

Meltable sucralose sweeteners can be used in a variety of food products such as cooked and hard candies (e.g. caramels, cough drops, etc.), microwave food products, glazed food products (e.g. honey baked hams), deep fried food products (e.g. doughnuts) and as a substitute for sweeteners that are commonly melted by heating (e.g. brown sugar). Meltable sucralose is expected to be particularly useful in food applications where uneven heating will require the sweetener to melt and dissipate heat to the surrounding ingredients (e.g. microwave products, etc.).

For example a flavored sugar free or reduced sugar hard candy can be made by combining isomalt (200 gm) and water (70 gm) in a pan and heating the mixture to 170° C. Optionally, sugar could be added to this mixture, but is not necessary. After the mixture has reached 170° C. and has the appropriate water content, the mixture is cooled to about 135–130° C. and flavorings and meltable sucralose is added. To make a fruit flavored sugar free hard candy, citric acid (3 gm), colorant (as desired), flavor (about 0.4 gm) and meltable sucralose (0.08 gm) would be added. The candy could then be shaped or molded and cooled until solid. The hard candy formed by this process would have a reduced calorie content and appropriate levels of sweetness.

The following non-limiting examples are provided to further illustrate the present invention. Numerous other embodiments of the present invention are possible which are consistent with the invention disclosed herein.

EXAMPLES

Blends of sucralose with varying amounts (by weight) of maltodextrin, sodium saccharin, aspartame, acesulfame-K, sodium citrate and calcium cyclamate were prepared by freeze-drying aqueous solutions. Typically, solutions of 25–50% solids were frozen in an open dish. The frozen dishes were then placed under vacuum overnight, until all liquid water was removed from the dish. The remaining white powder was lightly ground with mortar and pestle to remove any large particles of solids. Samples were stored in a sealed vial under refrigeration until analysis. DSC analysis was performed on all samples to determine the thermal transition temperatures. The results are shown in Table I below:

TABLE I

| Sample | Sample weight (mg) | Exotherm (° C.) |
|---|---|---|
| Micronized neat sucralose[1] | 5.80 | 136.8 |
| Neat sucralose | 3.10 | 120.9 |
| 2% Maltodextrin | 3.60 | 124.1 |
| 2% Na Citrate | 5.40 | 128.1 |
| 2% Aspartame | 5.40 | 122.4 |
| 10% Ca Cyclamate | 6.90 | 134.6 |
| 2% Na Saccharin | 5.86 | 125.7 |
| 25% Na Saccharin | 9.80 | 125.3 |
| 2% Ace-K | 5.30 | 120.2 |
| 10% Ace-K | 7.95 | 133.6 |
| 25% Ace-K | 5.20 | 179.3[2] |
| 50% Ace-K | 5.20 | 184.1[2] |

[1]As produced(i.e., not freeze dried). Only this sample (the control) was micronized.
[2]Endotherm All sucralose blends (as well as the neat sucralose samples) except for the blends with ace-K result in exothermic decomposition of the sample, leading to a charred residue in the DSC pan. The sucralose blends containing ace-K at or above the 25% level resulted in an endothermic melt of the material in the pan. Upon opening the DSC apparatus, the residual material (from the sucralose/ace-K blends containing 25% or more ace-K) was a clear solid. If the experiment is repeated on the same material in the pan, the melt temperature remains constant. Samples have been cycled through this test several times.

High concentrations of materials (having higher thermal transition temperatures than sucralose) other than ace-K raise the decomposition temperature of sucralose in proportion to their concentration. Most importantly, no material that we have found other than acesulfame-K has shown the ability to blend with sucralose to generate a product that melts endothermically as opposed to decomposing exothermically.

The experiment was repeated using non-micronized sucralose and freeze-dried samples containing sucralose and varying proportions (by weight) of Ace-K. The dry powder of each sample was analyzed using DSC and HPLC to confirm the concentration of each of the compounds in the samples. The results are displayed in Table II below:

TABLE II

| Sample | Endo-therm (° C.) | Ace-K (%)[3] | Sucralose (%)[3] | Moles of Suc to Ace-K | Mole Fraction Ace-K |
|---|---|---|---|---|---|
| 100% Sucralose | 120.3[4] | 0 | 95.3 | 1:0 | 0 |
| 90% Suc/ 10% Ace-K | 135.4[4] | 11.1 | 89.4 | 4:1 | 0.20 |
| 80% Suc/ 20% Ace-K | 177.6 | 20.6 | 76.1 | 1.7:1 | 0.37 |
| 70% Suc/ 30% Ace-K | 182.8 | 30.9 | 66.8 | 1:1 | 0.50 |
| 60% Suc/ 40% Ace-K | 181.8 | 40.5 | 57.6 | 1:1.6 | 0.62 |
| 50% Suc/ 50% Ace-K | 185.7 | 50.5 | 48.2 | 1:4 | 0.80 |
| 100% Ace-K | 278.4 | 95.5 | 0 | 0:1 | 1.0 |

[3]By HPLC.
[4]Exotherm.

FIG. 1 displays a graph of mole fraction of Ace-K (in Ace-K/sucralose blends) versus the DSC thermal decomposition temperature. Extrapolation shows that the stabilizing effect starts at a mole fraction of about 0.2 (i.e., 20 mol %), reaching a maximum at slightly above about 33 mole percent. Increasing the Ace-K content, while not adversely affecting the thermal stability of the blend, does not further increase the thermal transition temperature until the blend becomes predominantly Ace-K, i.e., a mole fraction of Ace-K of greater than about 0.8.

Figure 2:
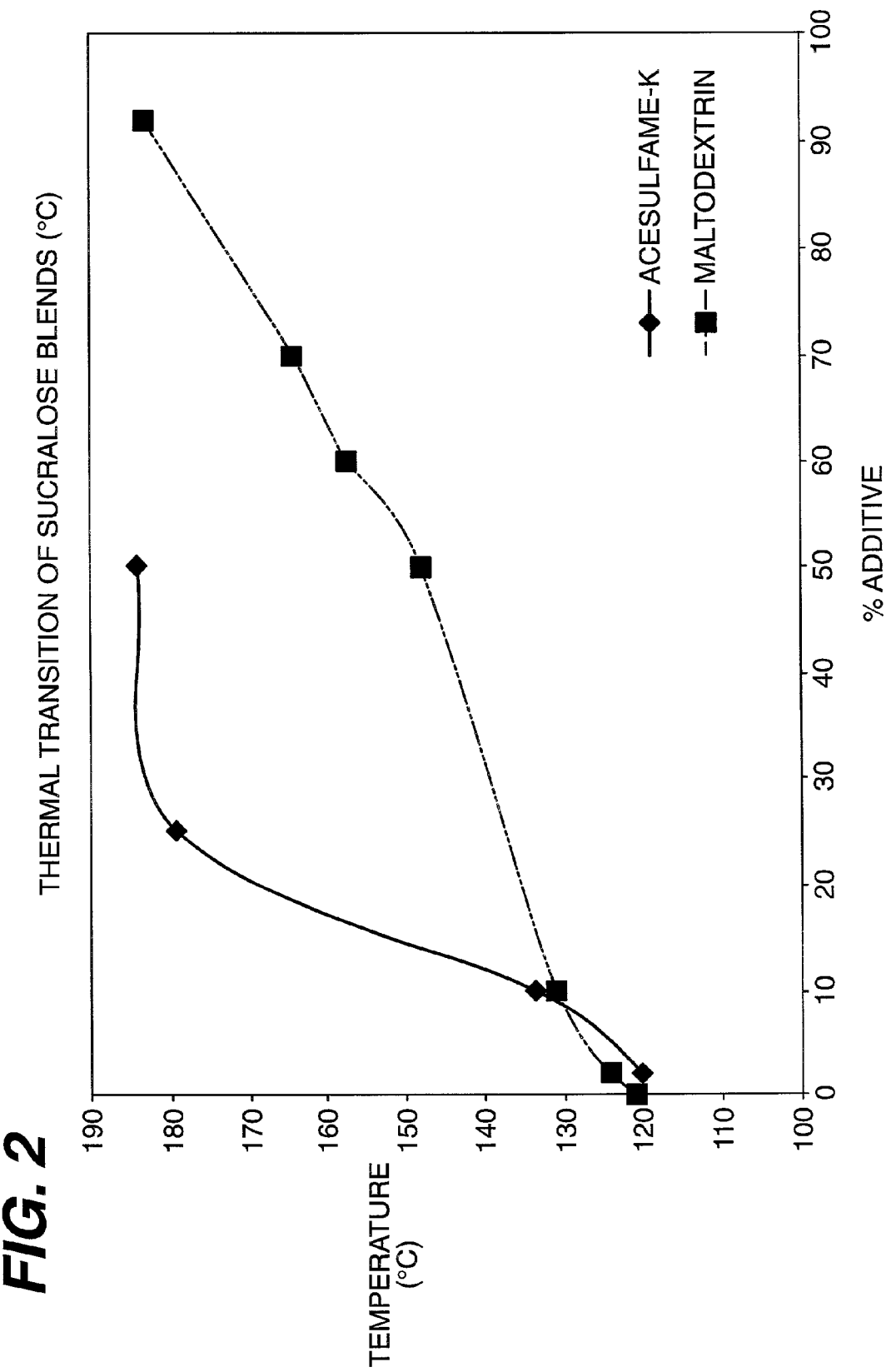
FIG. 2 is a graph comparing the thermal transition of sucralose intimately mixed with acesulfame-K and sucralose blended with maltodextrin.

FIG. 2 compares the DSC thermal transition temperature profiles of sucralose/ace-K blends with sucralose/maltodextrin blends. (The proportions of the additive are given in weight percent, based on weight of sucralose plus additive.) Both maltodextrin and ace-K have higher thermal transition temperatures than sucralose. But the two curves are quite different. When sucralose is blended with maltodextrin, the curve of thermal transition temperature vs. proportion of additive is essentially linear (i.e., the thermal transition temperature rises in direct proportion to the concentration of maltodextrin). Also, the blends decompose (exothermically) as opposed to simply melting. However, as is seen in the two graphs presented as FIGS. 1 and 2, when sucralose is blended with ace-K there is a sharp transition point beginning at about 0.2 mole percent (about 15 weight percent) at which the curve of thermal transition temperature vs. proportion of additive begins to rise sharply. At this point the transition between exothermic decomposition and endothermic melting also occurs. The shape of the curve plus the change from exothermic to endothermic thermal transition cannot be explained simply as dilution of sucralose with a higher melting or more thermally stable material.

Table III, below, gives the composition of the sucralose/maltodextrin blends and their thermal transition (exotherm) temperatures that provided the data for the graph shown in FIG. 3. Percentages are weight percent.

TABLE III

| Sample | Exotherm Temperature (° C.) |
|---|---|
| 100% Sucralose | 120.9 |
| 98% Sucralose/2% Maltodextrin | 124.1 |
| 90% Sucralose/10% Maltodextrin | 131.0 |
| 50% Sucralose/50% Maltodextrin | 147.8 |
| 40% Sucralose/60% Maltodextrin | 157.1 |
| 30% Sucralose/70% Maltodextrin | 164.2 |
| 8% Sucralose/92% Maltodextrin | 183.0 |

For comparison purposes, dry blends of sucralose and ace-K were made to demonstrate that a meltable composition was not formed. The composition of the dry blends was tested by HPLC for various places in the sample because of concerns about the uniformity of mixing of the sucralose and ace-K. DSC result for the samples are provided below with the BPLC results. As can readily be seen, there is no indication that a meltable sucralose composition has been formed based on the DSC results.

| HPLC Results 70% Sucralose/30% Ace-K (% Ace-K content) | | DSC Results 70% Sucralose/30% Ace-K (Transition Point ° C.) | |
|---|---|---|---|
| Middle Sample | Right Sample | Middle Sample | Right Sample |
| 27.33 | 32.03 | 128.6 | 128.5 |
| 26.66 | 29.32 | 130.9 | 129.0 |
| 29.14 | 29.88 | 129.4 | 129.4 |
| 28.86 | 30.06 | | |
| 29.65 | | | |
| avg. 28.33 | avg. 30.32 | Avg. 129.63 | avg. 128.97 |
| std dev. 1.2715 | std dev. 1.1816 | Std dev. 1.1676 | std dev. 0.4509 |
| CV 4.49% | CV 3.90% | CV 0.90% | CV 0.35% |

What is claimed is:

1. A meltable sucralose-containing sweetener consisting essentially of a dry, meltable blend of sucralose and acesulfame-K, wherein the meltable sucralose-containing sweetener melts endothermically without decomposing.

2. The meltable sucralose-containing sweetener of claim 1 containing from about 80 to about 20 mole percent sucralose and from about 20 to about 80 mole percent acesulfame-K.

3. The meltable sucralose-containing sweetener of claim 1 containing from about 65 to about 22 mole percent sucralose and from about 35 to about 78 mole percent acesulfame-K.

4. The meltable sucralose-containing sweetener of claim 1 wherein the meltable sucralose-containing sweetener is formed by spray drying an aqueous solution containing sucralose and acesulfame-K.

5. The meltable sucralose-containing sweetener of claim 1 wherein the meltable sucralose-containing sweetener is formed by freeze drying an aqueous solution containing sucralose and acesulfame-K.

6. The meltable sucralose-containing sweetener of claim 5 wherein the aqueous solution contains up to about 80 weight percent sucralose and acesulfame-K.

7. A food product made by combining other ingredients with a meltable sucralose-containing sweetener, wherein the meltable sucralose-containing sweetener consists essentially of a dry, meltable blend of sucralose and acesulfame-K, wherein the meltable sucralose-containing sweetener melts endothermically without decomposing.

8. The food product of claim 7 wherein the food product is selected from the group consisting of cooked candies, hard candies, microwave food products, deep fried food products and glazed food products.

9. The food product of claim 7 wherein the food product is a hard candy.

10. A process for making a food product comprising adding a meltable sucralose-containing sweetener to the ingredients for a food product, wherein the meltable sucralose-containing sweetener consists essentially of a dry, meltable blend of sucralose and acesulfame-K, wherein the meltable sucralose-containing sweetener melts endothermically without decomposing.

11. A process for making a food product comprising adding a melted sucralose-containing sweetener to said food product during the preparation of such food product; wherein the sweetener is a meltable sucralose-containing sweetener consisting essentially of a dry, meltable blend of sucralose and acesulfame-K and wherein the meltable sucralose-containing sweetener melts endothermically without decomposing.

12. A process for making a meltable sucralose-containing sweetener, wherein the meltable sucralose-containing sweetener melts endothermically without decomposing, comprising (a) forming an aqueous mixture of sucralose and acesulfame-K; and (b) drying said mixture to form the meltable sucralose-containing sweetener, said sweetener consisting essentially of sucralose and acesulfame-K.

13. The process of claim 12 wherein the aqueous mixture contains from about 80 to about 20 mole percent sucralose and from about 20 to about 80 mole percent acesulfame-K.

14. The process of claim 13 wherein the aqueous mixture contains from about 65 to about 22 mole percent sucralose and from about 35 to about 78 mole percent acesulfame-K.

15. The process of claim 12 wherein the aqueous solution contains up to about 80 weight percent sucralose and acesulfame-K.

16. The process of claim 12 wherein the aqueous solution containing sucralose and acesulfame-K is dried by spray drying.

17. The process of claim 12 wherein the aqueous solution containing sucralose and acesulfame-K is dried by freeze drying.

18. The meltable sucralose-containing sweetener of claim 1 wherein said meltable sucralose-containing sweetener melts endothermically at a temperature of 135° C. or above without decomposing.

19. The food product of claim 7 wherein said meltable sucralose-containing sweetener melts endothermically at a temperature of 135° C. or above without decomposing.

20. The process of claim 10 wherein said meltable sucralose-containing sweetener melts endothermically at a temperature of 135° C. or above without decomposing.

21. The process of claim 12 wherein said meltable sucralose-containing sweetener melts endothermically at a temperature of 135° C. or above without decomposing.

* * * * *